No. 12,276. REISSUED OCT. 18, 1904.

L. H. THULLEN.

AUTOMATIC TRAIN STOP.

APPLICATION FILED SEPT. 23, 1904.

3 SHEETS—SHEET 1.

Witnesses:
J. L. Roett
G. M. Haley

Inventor
Louis H. Thullen
By his Attorney
Geo. E. Crane.

No. 12,276. REISSUED OCT. 18, 1904.

L. H. THULLEN.

AUTOMATIC TRAIN STOP.

APPLICATION FILED SEPT. 23, 1904.

3 SHEETS—SHEET 2.

Witnesses:

J. H. Rott.

G. M. Haley

Inventor

Louis H. Thullen

By his Attorney

Fro. E. Crane.

No. 12,276. REISSUED OCT. 18, 1904.
L. H. THULLEN.
AUTOMATIC TRAIN STOP.
APPLICATION FILED SEPT. 23, 1904.
3 SHEETS—SHEET 3.
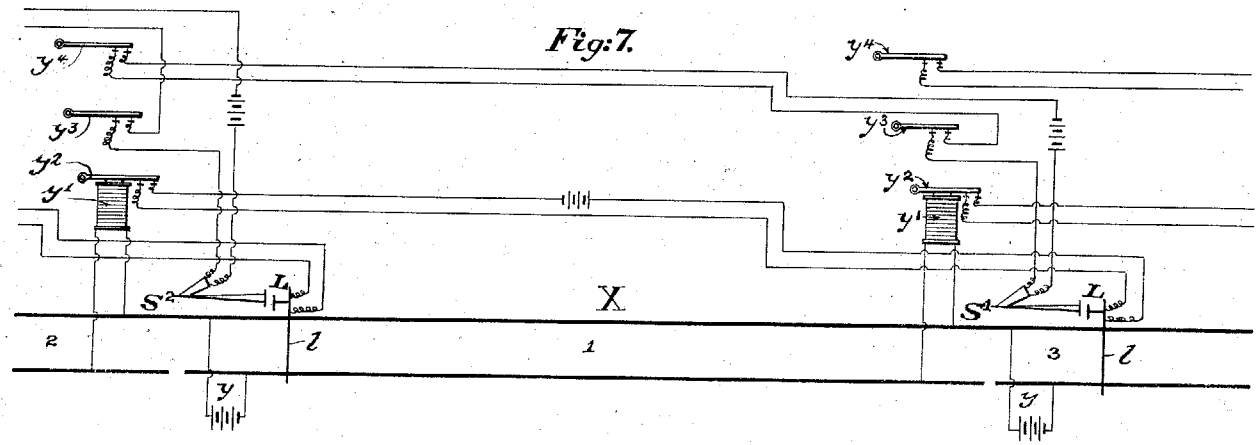
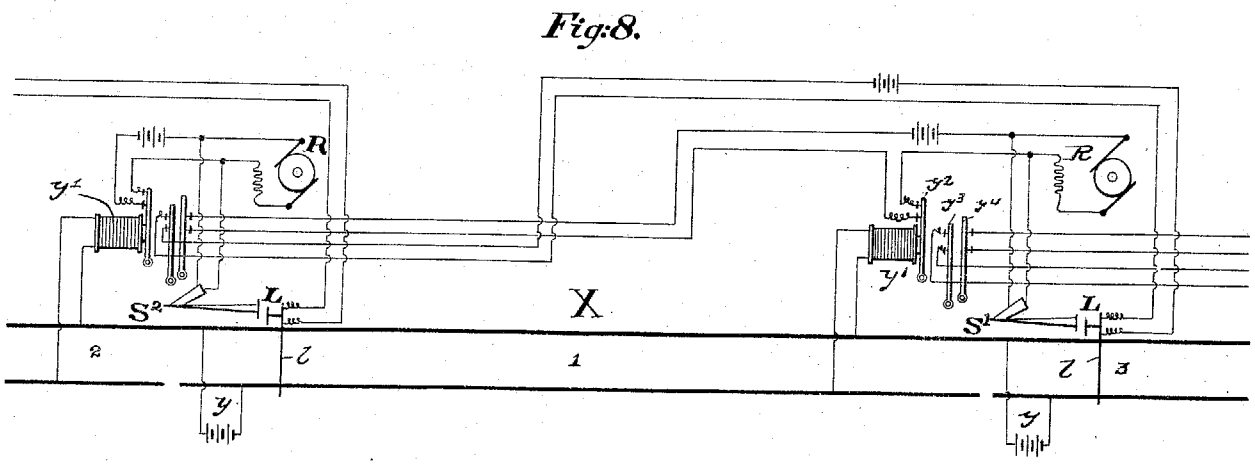
Witnesses:
J. R. Scott
G. M. Haley
Inventor
Louis H. Thullen
By his Attorney
Geo. E. Crouse.

No. 12,276. Reissued October 18, 1904.

UNITED STATES PATENT OFFICE.

LOUIS H. THULLEN, OF EDGEWOOD, PENNSYLVANIA, ASSIGNOR TO THE UNION SWITCH & SIGNAL CO., OF SWISSVALE, PENNSYLVANIA, A CORPORATION OF PENNSYLVANIA.

AUTOMATIC TRAIN-STOP.

SPECIFICATION forming part of Reissued Letters Patent No. 12,276, dated October 18, 1904.

Original No. 768,206, dated August 23, 1904. Application for reissue filed September 23, 1904. Serial No. 225,692.

*To all whom it may concern:*

Be it known that I, LOUIS H. THULLEN, a citizen of the United States, residing at Edgewood, in the county of Allegheny and State of Pennsylvania, have invented certain new and useful Improvements in Automatic Train-Stops, of which the following is a specification.

My invention relates to an automatic train-stop.

I will describe an automatic train-stop embodying my invention and a modification of my invention and then point out the novel features thereof in claims.

Figure 1:
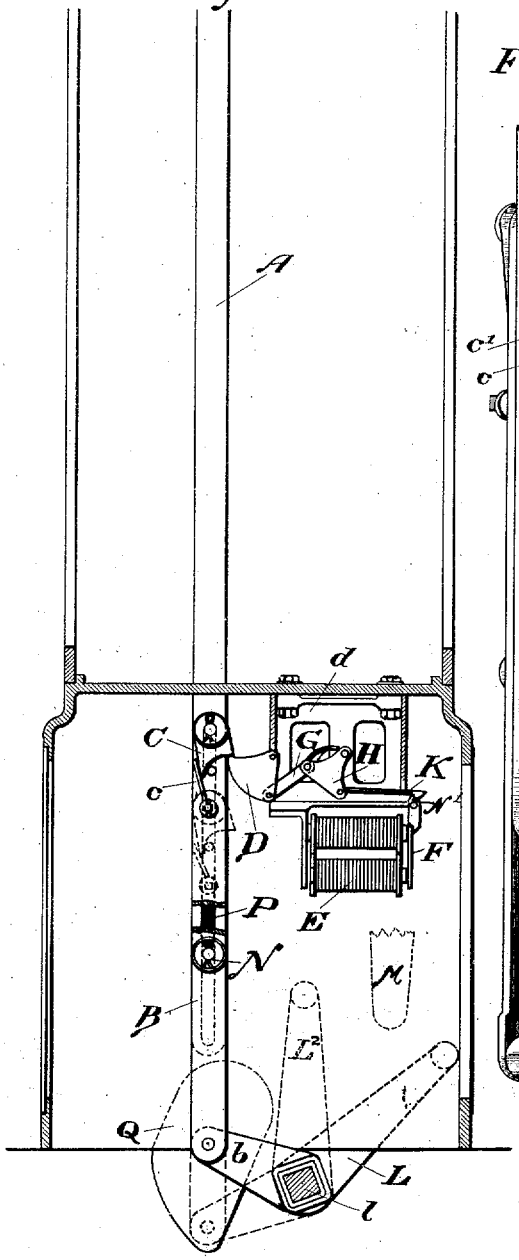
Figure 2A:
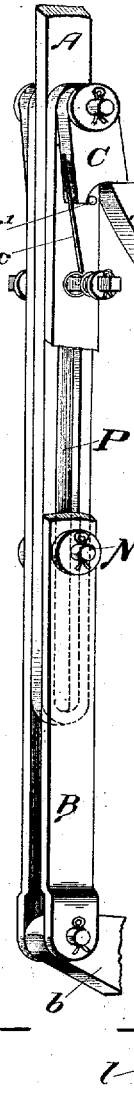
Figure 2:
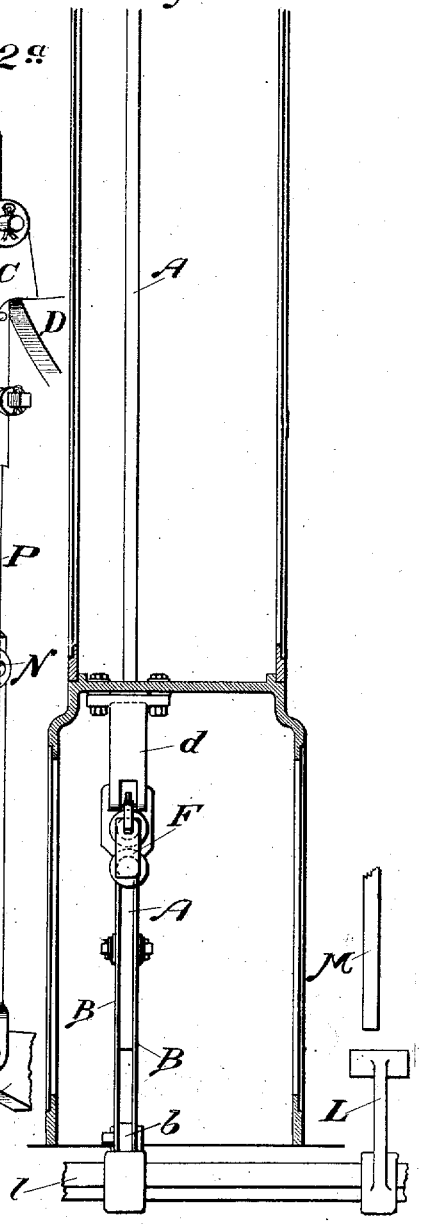
Figure 3:
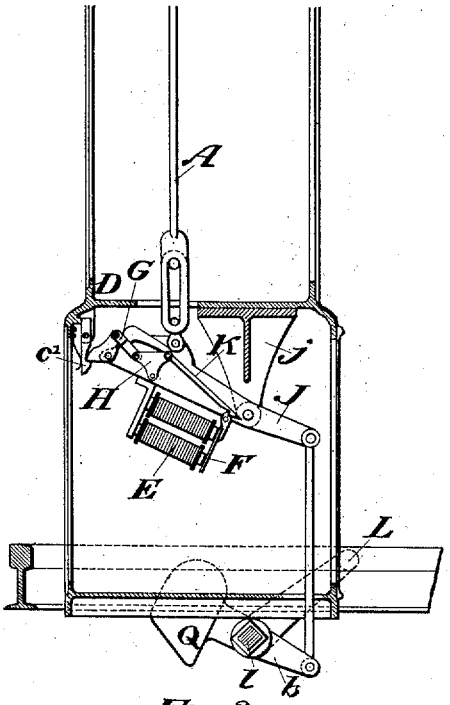
Figure 4:
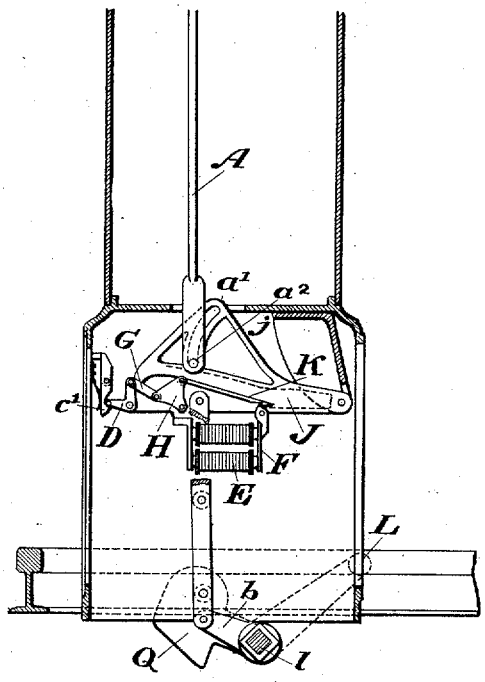
Figure 5:
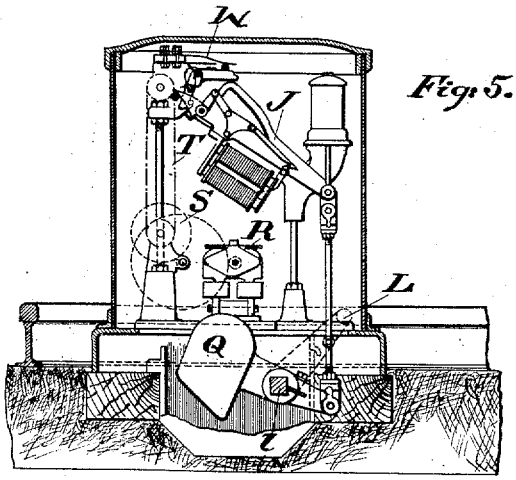
Figure 6:
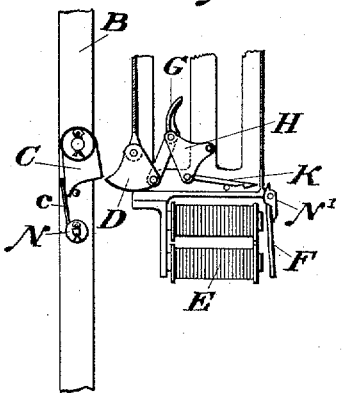

In the accompanying drawings, Figure 1 is a view, partly in elevation and partly in vertical section, of an automatic train-stop embodying my invention. Fig. 2 is a view of the construction shown in Fig. 1 in a plane at right angles to Fig. 1. Fig. $2^a$ is a detailed perspective view of a part of the apparatus shown in Figs. 1 and 2. Figs. 3, 4, and 5 are each detail views showing a modification of my invention. Fig. 6 is a detail view showing a different position of certain parts shown in Figs. 1 and 2. Figs. 7 and 8 are diagrammatic views of portions of a railway-track and of circuits for controlling the position of the automatic train-stop and of signals located adjacent the portions of railway-track.

Similar characters of reference designate corresponding parts in all of the figures.

L designates a stop or trip, which is here shown as consisting of a lever having laterally-extending projections. In one position the stop or trip is adapted to engage a lever M, carried by a train, which lever may control either a valve in the braking system or may operate a switch in the circuit of the motors of the train, or both. In another position it will not engage the lever. The dotted position $L^2$ in Fig. 1 is its operative position, and the other dotted position in the said figure is its inoperative position. The stop or trip L is rigidly mounted upon a shaft *l*, which shaft is suitably journaled adjacent a railway-track, as shown in Figs. 7 and 8. A counterweight Q is also connected with the shaft, and this counterweight normally acts to move the stop or trip to its operative position.

The stop or trip may be moved out of its operative position by any desired means; but I preferably employ automatically-operated means. In Figs. 1, 2, and $2^a$ the stop is moved to its inoperative position through a rod A, which has a suitable connection with the up-and-down rod of an automatically-operated semaphore-signal, and the stop is held in its inoperative position by an arrangement of parts electrically controlled and generally termed in the art an "electric slot mechanism" or an "electric locking means." The end of the rod A is provided with an elongated slot P, through which a pin or stud N extends, which pin is carried by a rod B, connected with an arm *b*, rigidly mounted on the shaft *l*. The arrangement of the pin N and slot P is such that when the pin P is at the lower end of the slot in the rod A a movement of the rod A will cause a movement of the rod B, and should the rod B be held in the position to which it has been moved by the rod A the rod A will be free to move downwardly again without in any way affecting the rod B. The rod B is here shown as consisting of two parts, between which the end of the rod A is placed, the pin N serving to retain the two parts of the rod in their relative positions. Each of the parts of the rod B is provided with a hinged catch C, although, if desired, only one such catch may be employed. Springs *c*, carried by each part of the rod B, bear upon the catches C and tend normally to force them outward, this outward movement being limited by a stop *c'*, also carried by each part of the rod B.

D designates a lever hinged to a fixed bracket *d*. The lever D is connected to a chain of levers G, H, and K in a manner substantially similar to that shown and described in United States Patent No. 611,943, issued October 4, 1898, to J. G. Schreuder. The end of the lever K is provided with a catch which is adapted to be engaged by a hook N' of the armature F, provided for electromagnets E. The arrangement of the levers G, D, H, and K and the armature F and their operation is substantially the same as that set forth in the patent above referred to, and this arrangement of parts is generally termed in the art an "electric slot mechanism" or an "electric locking means." When the armature F is attracted to the electromagnets E, the lever D will be held from movement, so that the catch or catches C may engage the lever and will be prevented from any return movement. Any other electrically-controlled means for holding the stop in an inoperative position may be employed.

The operation of the parts just described is as follows: Assuming the stop or trip to be in its dotted position $L^2$ and the rod A in such position that the lower end of its slot P will receive the pin N, then upon a movement of the automatic apparatus connected with the signal to which the rod A is connected the rod A will move and carry with it the rod B, so as to move the stop L to its inoperative position. When the stop has been moved to its inoperative position, the catches C will move to engage with the lever D, which will then support the rod B. When the trip L is to be set to its operative position, it is only necessary to deënergize the electromagnets E to have them release the armature F and permit the lever D to move on its pivot and become disengaged from the catch or catches C. (See Fig. 6.) With the lever D disconnected from the catch or catches C the counterweight Q will move the rod B downward and the stop or trip L to its operative position. The circuit of the electromagnet C may be controlled in any desired way. An arrangement of circuits for the electromagnets E is shown in Fig. 7.

Referring now to Fig. 7, X designates a portion of a railway-track, one of the rails of which is divided into sections by means of insulation to form block-sections. 1 indicates one of said sections, and 2 3 parts of adjacent sections. If desired, both the rails may be divided by insulation. Each of the block-sections is provided with a battery $y$ at one end and a relay $y'$ at its other end, which may be provided with a number of the contacts. In the drawings it is shown as being provided with three contacts which are controlled by armatures $y^2 y^3 y^4$, it being understood in practice that there will be only one armature to control the three contacts in their desired order. A plurality of armatures may be employed. A function of each relay $y'$ is to control a local circuit, including the operating mechanism for the semaphore-signals S′ or $S^2$. In the arrangement of the circuits shown in Fig. 7 the local circuit for each signal comprises an armature of the relay of the block-section which it immediately controls and the armature of the relay of the block-section next in advance. Therefore if a train is on either block-section 1 or 2 the circuit for the signal S′ will be open and the signal at "danger." The circuit, including the electromagnet E of the slot mechanism for each train-stop, is controlled by the relay of the block next in advance. For example, the stop located adjacent the signal S′ is controlled by the relay of the block-section 2. If desired, the electromagnets E of the slot-contact may be controlled also by the relay $y'$ of the block-section 1. In fact, it may be controlled from any one or a number of track-relays $y'$.

Assuming that there is no train on block-sections 1 and 2, the signals S′ and $S^2$ will be in a clear position of indication and the train-stops adjacent these signals will be in their inoperative positions. It may be mentioned here that my invention in train-stops may be employed in a normally clear system of signaling or a normally danger system of signaling. As shown in the drawings, the train-stop is employed in connection with a normally clear system of signaling. As soon as the train enters the block-section 1 the relay $y'$ will be short-circuited and the armature will fall away to open the three contacts. The signal S′ will go to "danger." As soon as the train leaves block-section 1 and enters block-section 2 the relay $y'$ of block-section 2 will be short-circuited and will drop its armature to open the local circuit of the signal $S^2$ and also to open the circuit of the electromagnets E of the train-stop adjacent the signal S′. The signal S′ will not clear after the exit of the train from its block, as its local circuit is carried through the armature of the relay $y'$ of block-section 2. As soon as the train leaves block-section 2 the signal S′ will clear, and in clearing it will move the train-stop adjacent it to its inoperative position, and it will be held in this position because the circuit of the electromagnets will be closed at relay $y'$ of block-section 2.

Referring now to Fig. 3, the levers D, G, H, and K are carried by a lever J, which is fulcrumed to a bracket $j$, provided in a suitable casing located adjacent the railway-track. One end of the lever is connected with an arm $b$, carried by a shaft $l$, and the other end of the lever is adapted to engage catches C′, suitably hinged in the casing. The rod A is slotted, as shown in Figs. 1 and 2, and engages with a pin $a$, carried by the lever J.

In Fig. 4 substantially the same arrangement is shown as in Fig. 3. The lever J, however, is pivoted at one of its ends and is provided with a slot $a'$, in which a pin $a^2$, carried by the rod A, moves.

The form of invention illustrated in Figs. 3 and 4 may be employed in the same arrangement of circuits as that shown in Fig. 7.

Fig. 5 illustrates a further modification of my invention. Substantially the same form of mechanism is employed for moving the stop or trip L to its inoperative position as that shown in United States Patent No. 611,943, issued October 4, 1898, to J. G. Schreuder. In this form of the invention an electric motor R is employed for moving the lever J. As the lever J is lifted by the gearing S and T, operated from the motor R, it operates a circuit-controller W to open a circuit on the motor. An arrangement of circuits in which the contacts shown in Fig. 5 may be employed is illustrated in Fig. 8. The signals $S'$ and $S^2$ are controlled in the same way as illustrated in Fig. 7.

What I claim as my invention is—

1. The combination with a stop located adjacent a railway-track, of automatically-operated means comprising an electric slot mechanism for moving it to and holding it in an inoperative position.

2. The combination with a stop located adjacent a railway-track, of automatically-operated means connected with said stop for moving it to an inoperative position, and an electric slot mechanism for holding the stop in an inoperative position.

3. In combination with a stop, a weight for moving it to an operative position, an automatically-operated means for moving it to an inoperative position, and a slot mechanism for holding it in an inoperative position.

4. In combination with a stop, an automatically-operated means for moving it to an inoperative position, and means electrically controlled for holding the stop in its inoperative position.

5. In combination with a stop, an automatically-operated means for moving it to an inoperative position, means electrically controlled for holding the stop in its inoperative position, and a track-circuit for controlling the means for holding the stop in its inoperative position.

6. In combination with a stop, a weight for moving it to an operative position, a signal mechanism for moving it to an inoperative position, and a slot mechanism controlled from a track-circuit for holding the stop in an inoperative position.

7. In combination with a stop, an automatically-operated signal mechanism for moving the stop to an inoperative position, and means electrically controlled for holding the stop in its inoperative position.

In testimony whereof I have signed my name to this specification in the presence of two subscribing witnesses.

LOUIS H. THULLEN.

Witnesses:

GEO. E. CRUSE,

JOSEPH E. WALSH.